(12) United States Patent
Schwaiger et al.

(10) Patent No.: US 10,317,523 B2
(45) Date of Patent: Jun. 11, 2019

(54) LIGHTING DEVICE FOR A VEHICLE AND VEHICLE HEADLIGHT

(71) Applicant: OSRAM GmbH, Munich (DE)

(72) Inventors: Stephan Schwaiger, Ulm (DE); Oliver Hering, Niederstotzingen (DE)

(73) Assignee: OSRAM GMBH, Munich (DE)

( * ) Notice: Subject to any disclaimer, the term of this patent is extended or adjusted under 35 U.S.C. 154(b) by 103 days.

(21) Appl. No.: 15/477,151

(22) Filed: Apr. 3, 2017

(65) Prior Publication Data

US 2017/0285162 A1   Oct. 5, 2017

(30) Foreign Application Priority Data

Apr. 5, 2016   (DE) .................. 10 2016 205 563

(51) Int. Cl.

| | |
|---|---|
| *G01S 13/88* | (2006.01) |
| *F21S 41/16* | (2018.01) |
| *G01S 13/93* | (2006.01) |
| *B60Q 1/00* | (2006.01) |
| *G01S 7/481* | (2006.01) |
| G08G 1/16 | (2006.01) |
| G01S 17/89 | (2006.01) |
| G01S 17/93 | (2006.01) |
| B60R 21/0134 | (2006.01) |

(52) U.S. Cl.
CPC ............ *G01S 13/88* (2013.01); *B60Q 1/0023* (2013.01); *F21S 41/16* (2018.01); *G01S 7/4814* (2013.01); *G01S 13/931* (2013.01); *B60R 21/0134* (2013.01); *G01S 17/89* (2013.01); *G01S 17/936* (2013.01); *G08G 1/16* (2013.01)

(58) Field of Classification Search
CPC .............................. B60Q 1/0023; F21S 41/14
USPC .................................................. 340/435, 436
See application file for complete search history.

(56) References Cited

U.S. PATENT DOCUMENTS

| | | | | |
|---|---|---|---|---|
| 5,959,552 | A * | 9/1999 | Cho ...................... | B60R 19/38 180/167 |
| 8,854,197 | B2 * | 10/2014 | Ikeda ..................... | G08G 1/165 340/425.5 |
| 8,938,337 | B2 * | 1/2015 | Nakakura .............. | E05C 17/00 340/426.24 |
| 9,482,412 | B2 * | 11/2016 | Schwaiger ............. | F21K 9/64 |
| 9,822,935 | B2 * | 11/2017 | Daniels ................. | H01S 5/4012 |
| 2003/0025799 | A1 | 2/2003 | Holz et al. | |

(Continued)

FOREIGN PATENT DOCUMENTS

| | | |
|---|---|---|
| DE | 10138361 A1 | 2/2003 |
| DE | 102011084762 A1 | 4/2013 |

(Continued)

OTHER PUBLICATIONS

German Search Report based on application No. 10 2016 205 563.1 (8 pages) dated Jan. 24, 2017 (for reference purpose only).

*Primary Examiner* — Eric Blount
(74) *Attorney, Agent, or Firm* — Viering, Jentschura & Partner MBB

(57) ABSTRACT

A lighting device for a vehicle is provided. The lighting device includes a light source with which at least one of useful light or assist light can be emitted into the surroundings, a sensor with which at least one of useful light or assist light reflected by the surroundings can be at least partially detected, and an electronic unit for evaluating at least one of the useful light or assist light sensed by the sensor.

16 Claims, 1 Drawing Sheet

(56) References Cited

U.S. PATENT DOCUMENTS

| | | | |
|---|---|---|---|
| 2004/0064240 A1* | 4/2004 | Sugano | B60K 31/0008 |
| | | | 701/93 |
| 2014/0003070 A1* | 1/2014 | Nakaya | B60Q 1/08 |
| | | | 362/466 |
| 2014/0369064 A1* | 12/2014 | Sakaue | G02B 27/0994 |
| | | | 362/553 |
| 2014/0379218 A1 | 12/2014 | Foltin | |
| 2015/0175053 A1 | 6/2015 | Schwaiger et al. | |
| 2015/0176778 A1 | 6/2015 | Schwaiger et al. | |
| 2015/0176805 A1 | 6/2015 | Schwaiger et al. | |
| 2015/0176809 A1 | 6/2015 | Schwaiger et al. | |
| 2015/0176811 A1 | 6/2015 | Schwaiger et al. | |
| 2016/0144785 A1* | 5/2016 | Shimizu | B60R 11/02 |
| | | | 340/435 |

FOREIGN PATENT DOCUMENTS

| | | |
|---|---|---|
| DE | 102013002683 A1 | 8/2014 |
| DE | 102013213649 A1 | 1/2015 |
| DE | 102013226614 A1 | 6/2015 |
| DE | 102013226622 A1 | 6/2015 |
| DE | 102013226624 A1 | 6/2015 |
| DE | 102013226645 A1 | 6/2015 |
| DE | 102013226650 A1 | 6/2015 |
| DE | 102013226652 A1 | 6/2015 |

\* cited by examiner

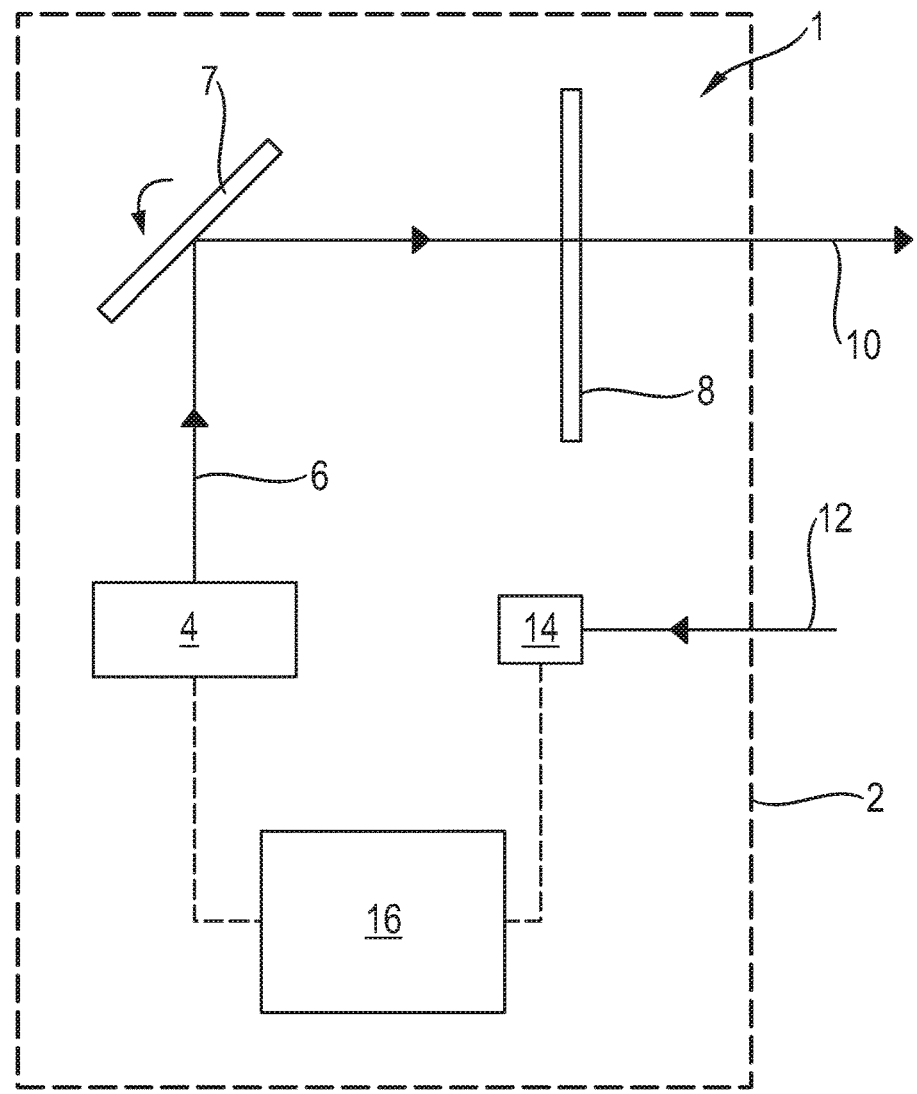

LIGHTING DEVICE FOR A VEHICLE AND VEHICLE HEADLIGHT

CROSS-REFERENCE TO RELATED APPLICATION

This application claims priority to German Patent Application Serial No. 10 2016 205 563.1, which was filed Apr. 5, 2016, and is incorporated herein by reference in its entirety.

TECHNICAL FIELD

Various embodiments relate generally to a lighting device for a vehicle, which lighting device has at least one light source with which a useful light and/or an assist light can be emitted into the surroundings. Furthermore, various embodiments relate to a vehicle headlight having such a lighting device.

BACKGROUND

Conventional vehicles have a multiplicity of safety functions which are dependent on ambient data of the vehicle. This has the effect of sensing, for example, bends, other vehicles etc. and correspondingly reacting. This usually requires a multiplicity of sensors, and depending on the sensor, also emitters for outputting radiation. Usually an ultrasonic system or a radar system is used for distance measurement. An ultrasonic system is used, for example, for a parking aid in which only one distance measurement takes place. Radar systems serve as distance control systems but also as a parking aid. Said systems can be provided as distance control systems for autonomous or partially autonomous driving. Such systems usually require additional installation space and give rise to additional costs.

SUMMARY

A lighting device for a vehicle is provided. The lighting device includes a light source with which at least one of useful light or assist light can be emitted into the surroundings, a sensor with which at least one of useful light or assist light reflected by the surroundings can be at least partially detected, and an electronic unit for evaluating at least one of the useful light or assist light sensed by the sensor.

BRIEF DESCRIPTION OF THE DRAWINGS

The drawing is not necessarily to scale, emphasis instead generally being placed upon illustrating the principles of the invention. In the following description, various embodiments of the invention are described with reference to the following drawings, in which the single figure shows a schematic illustration of a lighting device according to various embodiments.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments provide one or more safety functions in a vehicle, which functions are dependent on ambient data of the vehicle. A requirement for installation space, an expenditure on device technology and the costs are to be low.

Refinements can be found in the dependent claims.

According to various embodiments, a lighting device and/or a measuring device are/is provided for a vehicle and/or a vehicle lighting device. The lighting device has at least one light source with which useful light and/or assist light can be emitted into the surroundings. Furthermore, the lighting device may have at least one sensor with which useful light and/or assist light which is reflected by the surroundings and which is emitted, for example, by the at least one light source can be sensed or detected. In various embodiments, part of the useful light and/or part of the assist light, e.g. a predetermined wavelength range such as, for example, a blue portion of the useful light or of the assist light, can be sensed or detected. Furthermore, an electronic unit or an electronic control unit (ECU) or a control unit may be provided in order to evaluate the useful light and/or assist light sensed by the at least one sensor.

In this solution, the lighting device can thus, for example, carry out, in a simple fashion in terms of device technology, a distance detection of objects which are irradiated by the lighting device.

The useful light is used, for example, for a lighting function or for a signal light function. A turning light function and/or a fog light function and/or a dipped headlight function and/or a full beam function can be provided as lighting functions. A flashing indicator light function and/or a brake light function and/or a tail light function and/or a daytime running light function and/or a position light function and/or a fog function and/or combinations of these specified functions and of further functions can be provided as signal light functions. The useful light may be a primary light source.

The assist light is, for example, a light to be sensed or detected by the sensor and is provided, for example in a vehicle headlight, in addition to or as an alternative to the useful light. In addition, the assist light can be an infrared or an ultrasonic light source. The assist light may be not a primary light source. Furthermore, the assist light may not be provided for a lighting function or for a signal light function.

A further action or further actions may be initiated as a function of the sensed useful light and/or assist light, e.g. by the control unit. Braking and/or an avoidance maneuver and/or switching on or switching off a light and/or focusing a light can be provided as actions.

The vehicle can be an aircraft or a water-bound vehicle or a land-bound vehicle. The land-bound vehicle can be a motor vehicle, a rail vehicle or a bicycle. The use of the lighting device may be provided in a truck or passenger motor vehicle or motorcycle.

In a further refinement of various embodiments, the light source is embodied as a laser-activated remote phosphor (LARP) system. Such a light source can easily be controlled and/or has a high resolution, by which means the useful light, or a part of the useful light, emitted by this light source can be used to sense the surroundings precisely.

In the LARP system, a conversion element which is arranged at a distance from the radiation source and which has luminescent material or is composed thereof is irradiated with excitation radiation, e.g. at least one excitation beam (pumping beam, pumping laser beam), e.g. with an excitation beam of a laser diode. The excitation radiation of the excitation beam is absorbed by the luminescent material and converted at least proportionally into conversion radiation (emission radiation) whose wavelengths and therefore spectral properties and/or color are determined by the conversion properties of the luminescent material.

The conversion light and, if appropriate, non-converted excitation light form the useful light. For example in the case of the use of a blue laser diode, using excitation radiation in the wavelength range from approximately 440 to 470 nm and a yellow luminescent material convertor, for example composed of Cer-doped yttrium aluminum granate, that is to say Ce: YAG, as the proportion of added non-converted laser radiation with respect to the conversion light decreases, a bluish, white-bluish, white, white-yellowish or yellow useful light is produced.

In a further refinement of various embodiments, a direction of the useful light and/or of the assist light, of the light source or of the LARP system can be adjusted. The adjustment of the useful light and/or of the assist light is carried out, for example, continuously or in stages or by switching. A LARP system with adjustable useful light is disclosed, for example, in documents DE 10 2013 226 624 A1, DE 102013226652 A1, DE 102013226650 A1, DE 102013226645 A1, DE 102013226622 A1 or DE 10 2013 226 614 A1. Such a LARP system or LARP scanner can then be used for distance detection and angle detection. The functional principle can be similar to a light detection and ranging (Lidar) system or else a radar system.

The use of a LARP system cam permit a lighting function and a distance and angle measurement and angle information can additionally be made available.

In order to adjust the direction of the useful light of the LARP system and/or of the assist light, a micro-electromechanical component, for example a digital micromirror device (DMD) or a micro-electromechanical system (MEMS) can be used. It is conceivable also to provide the micro-electromechanical component not for the LARP system and/or for the assist light but rather for another light source and/or for another additional light source such as, for example, a light emitting diode (LED) or for a multiplicity of LEDs or a laser. When a MEMS is used, it may be pivotable or rotatable. If a DMD is used, it can be secured, wherein "pivoting" of the useful light and/or of the assist light is carried out by switching individual mirrors or a plurality of mirrors.

A light emitting diode (LED) can be present in the form of at least one LED which has a single housing or in the form of at least one LED chip which has one or more light emitting diodes. A plurality of LED chips can be mounted on a common substrate ("submount") and form an LED or be mounted individually or jointly e.g. on a board (e.g. FR4, metal core board etc.) ("CoB"=chip on board). The at least one LED can be equipped with at least a separate optical system and/or common optical system for directing the radiation, for example having at least one Fresnel lens or a collimator. Instead of or in addition to inorganic LEDs, for example based on InGaN or AlInGaP, organic LEDs (OLEDs, e.g. polymer OLEDs) can generally also be used. The LED chips can be directly emitting or can have a luminescent material mounted in front of them. Alternatively, the LED can be a laser diode or a laser diode arrangement.

The emission wavelengths of the LED can be in the ultraviolet, visible or infrared spectral range. The LED chips may emit white light in the standardized ECE white field of the motor vehicle industry.

As an alternative to or in addition to a light source having a microelectromechanical component for changing the direction of the useful light and/or assist light it is also conceivable to provide one or more LEDs which are arranged, for example, as a matrix (e.g. as a projection system or systems or by means of one or more reflectors), which is extremely cost-effective and simple in terms of device technology. In various embodiments, the multiplicity of LEDs are positioned with respect to one another in such a way that their common emitted light produces a matrix. A resolution or accuracy of the detection by the sensor can then be scaled as a function of the number of LEDs or a height and/or width of portions of a light distribution. The matrix is, for example, a unidimensional matrix which has a row or a column or is a two-dimensional or multidimensional matrix.

Changes in the useful light and/or assist light reflected by an object (road, obstacle, pedestrian etc.) can be sensed with the electronic unit. For example transit time differences of the useful light and/or assist light can be sensed as a change. Alternatively or additionaly, it is conceivable to sense a frequency shift (Doppler effect) of the useful light and/or assist light, by which means speed information of an object which reflects the useful light and/or assist light can be determined. Furthermore, alternatively or additionally a change in a signal strength of the useful light and/or assist light can be sensed. Furthermore it is conceivable to configure the electronic unit in such a way that the type of an object which reflects the useful light and/or assist light can be determined with this electronic unit on the basis of a sensed change in a light intensity of the useful light and/or assist light.

In other words, useful light and/or assist light reflected from objects can therefore be detected by sensors and evaluated by the electronic unit. Various parameters of the surroundings can then be calculated on the basis of changes in the reflected or detected signal. Changes are, for example, frequency shifts, a change in a signal strength or transit time differences between a first or second signal or a first and second emitted useful light and/or assist light.

A distance from objects, a speed of the objects and/or an (absolute, relative or angular) position of objects can be determined as parameters of the surroundings. It is also conceivable to detect the type of an object on the basis of e.g. the reflectivity and therefore the intensity of the detected useful light and/or assist light, wherein, for example, a road or else a road covered in ice has different reflectivity from, for example, grass, road signs or trees.

In a further refinement of various embodiments, the useful light and/or assist light is modulated. In various embodiments, in this context time-dependent control of the parameters of the intensity and/or phase and/or polarization take place. An angle and distance measurement can be improved further through the modulation of the useful light and/or assist light. The modulation of the useful light and/or assist light preferably takes place in an angle-dependent fashion. That is to say the useful light is adjusted as a function of the adjustable radiation angle. It would also be conceivable not to modulate the useful light and/or assist light in an angle-dependent fashion, which is simpler in terms of device technology. Alternatively or additionally, it is conceivable to provide the modulation continuously or in a pulsed fashion. Alternatively or additionally it is conceivable not to perform the modulation in an angle-dependent fashion but instead in a way which is chronologically offset for various angle ranges. That is to say, for example, firstly in a first pixel (or first angle range), and then in a second pixel (or angle range), and then in a third pixel (or angle range) etc. In this way, an (integral) sensor can be correlated with the information as to which pixel is currently being modulated, and therefore the correlation between an angle e.g. of a detected object and the distance therefrom can be produced.

Furthermore, merely a change in the light intensity of the useful light and/or assist light can be provided as modulation. It is conceivable to dispense with modulation of the useful light and/or assist light in specific embodiments. In other words, for example just one emission of an intensity pulse (e.g. also referred to simply as "switching on/off") takes place when a system is not coherent. This may be provided, for example, when phase information (coherence) is lost through optical elements which are connected downstream. This can be carried out by means of a convertor in an LARP system, for example. In such a case, no speed information, for example from a frequency shift, can be detected by means of an evaluation but instead in principle only distances from objects can be determined. However, if an LARP system with an adjustable direction of the useful light and/or an assist light with an adjustable direction is used, the angle information which is still present, and also a plurality of subsequent "images" can be evaluated, by which means precise positioning and also determination of speed is also made possible.

In a further refinement of various embodiments, the modulation or the non-performance of modulation occur as a function of vehicle parameters and/or of ambient conditions and/or external influences and/or of other road users. Vehicle parameters are, for example, a speed of the vehicle or a steering angle. The external influences can be, for example, weather influences (fog), the condition of the road or a traffic situation (on-coming traffic, travel in the town cycle). In the case of dependence on other road users, for example a relative speed with respect to traffic travelling ahead can be taken into account. The modulation or else the non-performance of modulation can therefore be adapted to the specified situations or be dependent on the specified situations.

Alternatively or additionally it is conceivable that the modulation and/or a pulse sequence and/or a pulse frequency are/is vehicle-specific and/or can be adapted as a function of one other vehicle. As result, for example communication between vehicles is easily made possible. A pulse is, for example, the increasing of a light intensity of the useful light and/or assist light in a specific time. In one pulse sequence it is then possible to provide a plurality of identical or different pulses which are embodied in chronological succession. The pulse frequency is, for example, the frequency of an individual pulse.

It may be provided that the useful light sensed by the sensor and/or the assist light sensed by the sensor or a part of the useful light sensed by the sensor or a part of the assist light sensed by the sensor is embodied as electromagnetic radiation in the vicinity of the visible light such as, for example, infrared radiation or ultraviolet radiation, or in the visible range. The electromagnetic radiation is preferably in the wavelength range 400 nm-780 nm (visible) or in the near infrared range (780 nm-2000 nm).

In a further refinement of various embodiments, a multiplicity of light sources, e.g. a multiplicity of vehicle lights, can be provided. In this context, a property or properties of the useful light and/or assist light emitted by a respective light source can differ from one another or be the same. As result, a relatively high information density is made possible which leads to higher resolution and accuracy. It is conceivable that the modulations for a respective light source such as, for example, in the frequency, the intensity and/or the angular range passed through, are in the same direction or in opposite directions with respect to one another. Furthermore, wavelengths of the light sources can be the same or different. Alternatively or additionally, lighting ranges of the light sources can be the same or different. If they are the same, it is conceivable that they are mirror-symmetrical with respect to the longitudinal axis of the vehicle. Furthermore, it is conceivable that alternatively or additionally lighting frequencies of the light sources are the same or different. Lighting frequency is to be understood as, for example, the frequency at which the adjustable useful light and/or assist light of the light source passes through a lighting range.

In various embodiments, differential mode clocking or phase-shifted clocking occurs in the case of a left-hand or right-hand vehicle headlight or in the case of a left-hand or right-hand vehicle light or when a plurality of headlights or vehicle lights are used.

Furthermore, it can alternatively or additionally be provided that modules and/or light distributions overlap completely, partially or do not overlap. For example, two light sources can be provided, wherein one can be arranged in a left-hand headlight of the vehicle, and one in a right-hand headlight of the vehicle.

Alternatively or additionally, such a light source can be provided in each of three brake lights. It is also conceivable to provide four or more such light sources, wherein in each case one is arranged e.g. in a left-hand and right-hand dipped headlight and in each case one is provided in a left-hand and right-hand full beam light of the vehicle.

It is conceivable to provide an opto-electronic component, such as for example a photo-multiplier, a photo-diode, a photo-transistor or a photo-resistor, as a sensor. It is also conceivable to provide a sensor which is integrated into an imaging measuring method and can therefore be subdivided, such as for example a CMOS sensor or a CCD sensor.

In a further refinement of various embodiments, the LARP system has a converter which is transmissive in a specific wavelength range, e.g. for the assist light. As a result, an additional light source or the assist light can be used, which light source or assist light emits light in the specific or determined wavelength range, which can then pass through the converter preferably fully coherently or alternatively incoherently. Nevertheless, only one system is provided, which is simple in terms of device technology. In other words, this one system can then simultaneously make available the actual lighting function, such as for example with a blue light source and a yellow converter, and a "lidar function", for example by means of an IR light source or the assist light.

The light source or light sources (transmitters) and the sensor may be synchronized, e.g. in the case of a pulsed operating mode.

Furthermore, a vehicle headlight having a lighting device according to one or more of the preceding aspects is advantageously provided.

In the following, various embodiments will be explained in more detail.

According to the figure, a lighting device 1 is illustrated. The latter is here part of a vehicle head light 2, which is indicated schematically by a dashed line. The lighting device 1 has a light source which is embodied as a LARP system. The LARP system has a pumping light source 4, which may be a blue LED or a blue laser diode which emits pumping light 6. The latter is directed onto a converter or a conversion element 8 by means of a pivotable mirror 7 or by means of an MEMS. Useful light 10 then exits the conversion element 8 and is therefore emitted into the surroundings. The pumping light 6 can be modulated, wherein the useful light 10 is therefore also modulated. The emitted useful light is at least partially reflected by the surroundings and can be sensed as reflected useful light 12 by a sensor 14 of the lighting device 1. It would also be conceivable for the sensor 14 to be arranged outside the vehicle headlight 2. The useful light which is sensed by the sensor 14 is then evaluated by an electronic unit 16 to which the sensor 14 is connected. The electronic unit 16 can also be provided outside the vehicle headlight. The electronic unit 16 is either part of the lighting device 1 or part of a vehicle which uses the lighting device 1.

Between the light source 4 and the exiting of the light from the headlight 2, said light is as a rule guided by various optical elements, e.g. by what is referred to as a primary optical unit or a plurality of primary optical units, between the light source 4 and the mirror 7 and/or between the mirror 7 and the converter 8 and/or by means of what is referred to as a secondary optical unit or a plurality of secondary optical units downstream of the converter 8.

In the case of an implementation of the lighting device 1 with a DMD (which can contain a plurality of small adjustable mirrors) instead of the individually pivotable mirror 7, the result is the possibility of positioning the conversion element 8 between the light source 4 and the DMD.

Changes to the useful light 10, 12, such as for example transit time differences, frequency shifts or changes in a signal strength, can then be sensed with the electronic unit. Parameters of the surroundings, such as for example a distance from other road users or other objects, can then be calculated from said changes. It is also possible, for example, to determine a speed of other road users or objects.

It is also conceivable that the conversion element 8 is configured in such a way that it translates a relatively small or relatively large part of the pumping light 6 or of light of a further light source as coherent or incoherent radiation. It would also be conceivable for the conversion element 8 to be transparent to an incident radiation, e.g. of a further light source, with the result that no interaction at all occurs with the conversion element 8, and the full coherence is maintained for the further radiation. It is alternatively conceivable that the further radiation is partially scattered, for example at the conversion element 8, as a result of which the further radiation which exits the conversion element 8 is no longer completely coherent but is not incoherent either. The further radiation which is reflected by the surroundings can then be sensed by means of the sensor 14 and used by the electronic unit 16 to determine the parameters of the surroundings.

A lighting device for a vehicle having a light source with which useful light can be emitted into the surroundings is disclosed. Furthermore, a sensor is provided with which the useful light reflected by the surroundings can be detected, wherein the detected useful light can be evaluated by an electronic unit in order to draw conclusions about the surroundings.

LIST OF REFERENCE NUMBERS

Lighting device 1
Vehicle headlight 2
Pumping light source 4
Pumping light 6
Mirror 7
Conversion element 8
Emitted useful light 10
Reflected useful light 12
Sensor 14
Electronic unit 16

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting device for a vehicle, the lighting device comprising:
    a light source with which at least one of useful light or assist light can be emitted into the surroundings; wherein the light source is embodied as a laser-activated remote phosphor system;
    a sensor with which at least one of useful light or assist light reflected by the surroundings can be at least partially detected; and
    an electronic unit for evaluating at least one of the useful light or assist light sensed by the sensor.

2. The lighting device of claim 1,
    further comprising a microelectromechanical component configured to adjust a direction of at least one of the useful light or of the assist light of the light source.

3. The lighting device of claim 1,
    wherein changes in at least one of the useful light or assist light can be sensed with the electronic unit.

4. The lighting device of claim 3,
    wherein at least one of the following can be sensed as changes:
        transit time differences of at least one of the useful light or assist light a frequency shift of at least one of the useful light or assist light; and
        a change in a signal strength of at least one of the useful light or assist light.

5. The lighting device of claim 1,
    wherein the electronic unit is configured in such a way that the type of an object which reflects the useful light can be determined with this electronic unit on the basis of a light intensity of the sensed at least one of useful light or assist light.

6. The lighting device of claim 1,
    wherein at least one of the useful light/or assist light are/is modulated.

7. The lighting device of claim 6,
    wherein the modulation of at least one of the useful light or assist light is not angle-dependent or is angle-dependent.

8. The lighting device of claim 6,
    wherein the modulation is dependent on at least one of a group of parameter, the group consisting of:
        vehicle parameters;
        ambient conditions; and
        other road users.

9. The lighting device of claim 6,
    wherein at least one of the following is vehicle-specific:
        the modulation of at least one of the useful light or assist light;
        a pulse sequence of at least one of the useful light or assist light; and a pulse frequency of at least one of the useful light or assist light.

10. The lighting device of claim 6,
wherein at least one of the following can be adapted as a function of one other vehicle:
the modulation of at least one of the useful light or assist light;
a pulse sequence of at least one of the useful light or assist light; and
a pulse frequency of at least one of the useful light or assist light.

11. The lighting device of claim 1,
wherein a multiplicity of light sources is provided;
wherein properties of at least one of the useful light or assist light emitted by a respective light source differ, or wherein the properties are the same.

12. The lighting device of claim 11,
wherein the modulations for a respective light source are carried out in the same direction or in the opposite direction.

13. The lighting device of claim 1,
wherein the laser-activated remote phosphor system comprises a convertor which is transmissive in a specific wavelength range.

14. A vehicle headlight, comprising:
a lighting device, comprising:
a light source with which at least one of useful light or assist light can be emitted into the surroundings;
a sensor with which at least one of useful light or assist light reflected by the surroundings can be at least partially detected; and
an electronic unit for evaluating at least one of the useful light or assist light sensed by the sensor.

15. A lighting device for a vehicle, the lighting device comprising:
a light source with which at least one of useful light or assist light can be emitted into the surroundings; wherein the light source is embodied by a multiplicity of light-emitting diodes;
a sensor with which at least one of useful light or assist light reflected by the surroundings can be at least partially detected; and
an electronic unit for evaluating at least one of the useful light or assist light sensed by the sensor.

16. The lighting device of claim 15,
wherein the light-emitting diodes are arranged in a matrix.

* * * * *